Dec. 6, 1960 E. A. RAGER ET AL 2,963,119
EMERGENCY BRAKING MECHANISM FOR TRUCKS AND TRAILERS
Filed Dec. 22, 1959 2 Sheets-Sheet 1
FIG_1
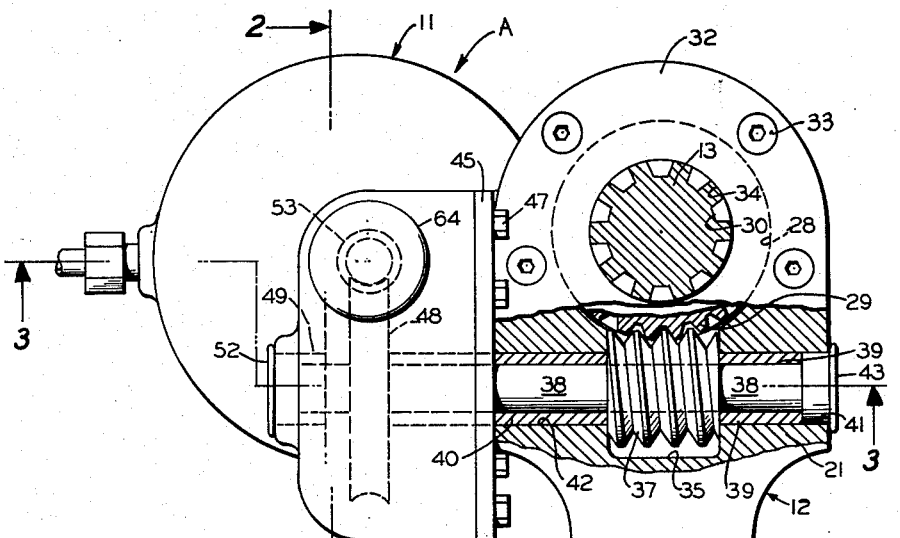
FIG_2
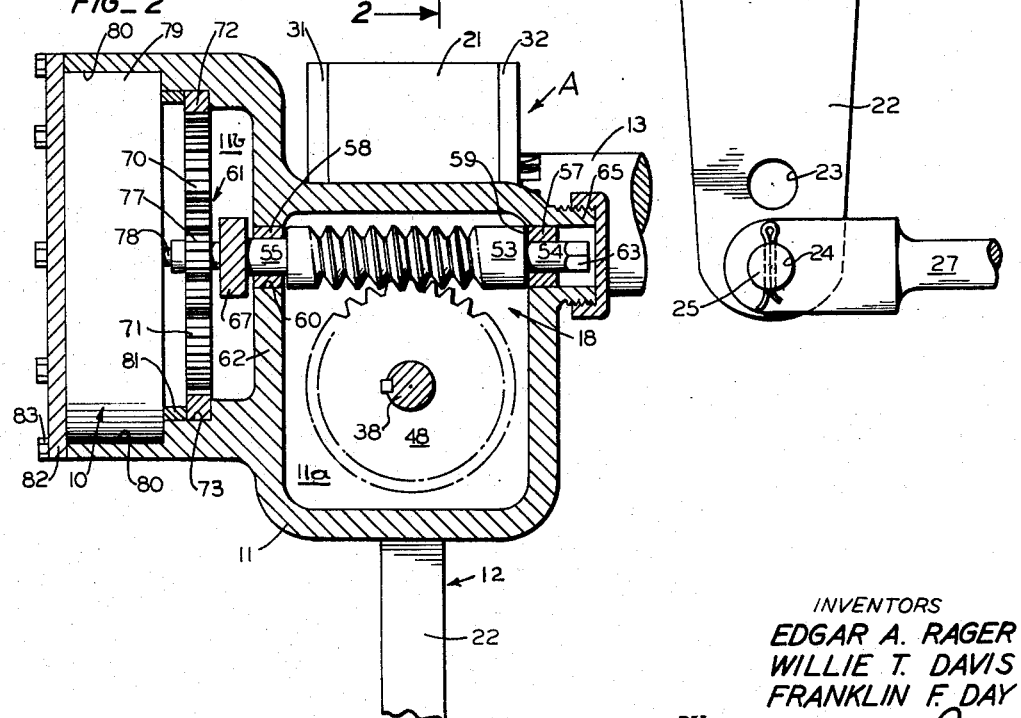
INVENTORS
EDGAR A. RAGER
WILLIE T. DAVIS
FRANKLIN F. DAY
BY Hansen and Lane
ATTORNEYS

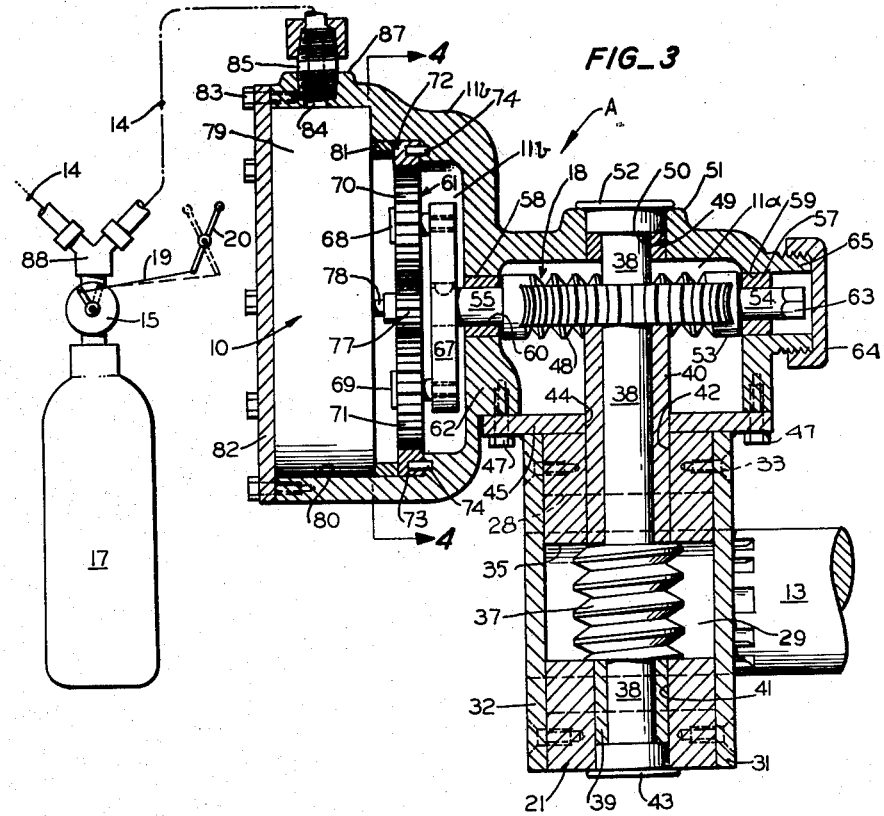
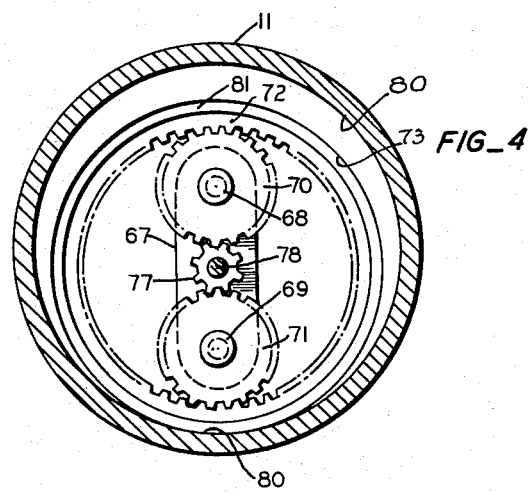

United States Patent Office 2,963,119
Patented Dec. 6, 1960

2,963,119

EMERGENCY BRAKING MECHANISM FOR TRUCKS AND TRAILERS

Edgar A. Rager, 1210 Sandia Ave., Sunnyvale, Calif.; Willie T. Davis, 5294 Alum Rock Ave., San Jose, Calif.; and Franklin F. Day, 18660 Paseo Lado, Saratoga, Calif.

Filed Dec. 22, 1959, Ser. No. 861,259

6 Claims. (Cl. 188—106)

The present invention relates to brakes, and pertains more particularly to emergency actuating means for heavy duty, cam-actuated brakes of a type commonly used on motor trucks and trailers.

In braking a heavy truck or truck-trailer down a long grade, the brakes become hot and frequently "fade" or lose their braking power due to expansion of the parts under the action of the excessive heat generated. If the brakes of a truck or trailer start to fade well above the bottom of a long grade, such as those frequently encountered in mountain driving, continued application of the brakes increases the heating thereof, and may result in a runaway truck or trailer.

The present invention contemplates the provision of an emergency braking mechanism, which, upon actuation thereof, and regardless of the position of the usual brake actuating arm, will turn the brake shoe actuating cam with tremendous force to its maximum braking position, thereby locking the wheels of the truck or trailer with which said mechanism is associated and bringing the truck or truck-trailer upon which it is mounted to an emergency stop. Such emergency braking action may, and undoubtedly will in many instances, result in tire damage and possibly even wheel damage, but at least it will save the truck and/or trailer from destruction, and may prevent loss of life.

A further object of the invention is to provide an independent prime mover on the brake arm of a truck brake, and to operatively connect said prime mover to the brake shoe actuating cam shaft upon which such brake arm is mounted, for emergency maximum operation of said cam shaft and the brake shoes actuated thereby.

The invention also provides an improved and simplified emergency braking means comprising an air motor mounted on a truck brake arm and geared to the brake shoe actuating cam shaft, an emergency supply of compressed air or gas being provided independent of the truck braking system, and releasable in an emergency to actuate the air motor, causing the latter to turn the brake shoe actuating cam to its maximum operated position.

These, and other objects and advantages of the invention, will be apparent from the following description and the accompanying drawings, wherein:

Fig. 1 is a side elevational view of an emergency brake actuating mechanism embodying the invention as said mechanism appears when mounted on one of a pair of truck brake arms, a brake shoe actuating cam shaft being shown sectionally, portions being broken away.

Fig. 2 is a sectional view taken along line 2—2 of Fig. 1.

Fig. 3 is a sectional view taken along line 3—3 of Fig. 1, a pressure vessel and valve being included, and piping and remote control valve mechanism being shown diagrammatically.

Fig. 4 is a sectional view taken along line 4—4 of Fig. 3.

Briefly, illustrative emergency brake actuating mechanism A embodying the present invention comprises a conventional, compressed air driven motor 10 mounted in a combined motor and gear housing 11 which in turn is mounted on the usual actuating arm 12 of a brake shoe actuating cam shaft 13. The air motor 10 and a similar one, not shown, mounted on the brake mechanism of the other wheel of a pair thereof for which the present invention is intended, is adapted to be connected, by air supply lines 14 (Fig. 3) through an emergency valve 15, to a supply of highly compressed gas in a container 17 which may be a suitable pressure vessel.

The air motor 10 drives, through speed reducing gearing 18 (Fig. 3) the conventional brake shoe actuating cam shaft 13. The emergency valve 15 is suitably connected, as by usual linkage, indicated diagrammatically at 19 in Fig. 3, with an emergency actuating handle 20 mounted within reach of the driver of a truck or truck-trailer upon which the mechanism A is mounted.

Release of the supply of highly pressurized gas from the container 17 through the lines 14 drives the air motor 10, which, through the gearing 18 turns the cam shaft 13 to its maximum operated condition, thereby locking the brakes and bringing the vehicle upon which the mechanism A is mounted to an emergency stop.

Referring to the drawings in greater detail, the truck brake arm 12 is of a well known type, and may be similar to those used on a large number of existing heavy duty trucks and trailers. The brake arm 12 comprises a hub portion 21 and an integral, radially extending arm portion 22. The latter is provided with two holes 23 and 24 for selectively receiving a shackle pin 25 by means of which the bifurcated end of a conventional brake actuating rod 27 is connected to said arm.

The other end, not shown, of the rod 27 is operatively connected to the usual diaphragm or piston (not shown) of the usual compressed air actuating means (not shown) of the air brake mechanism with which the truck or trailer upon which the mechanism A is mounted is equipped. Since such air brakes and their actuating mechanisms are well known, it will be unnecessary to illustrate or describe them herein.

The hub portion 21 of the brake arm 12 has a cylindrical gear opening 28 transversely therethrough, and a usual, internally splined worm gear 29 is journaled rotatably therein. The concentric splined opening 30 of this worm gear 29 is fitted onto the correspondingly splined end of the brake shoe actuating cam shaft 13. Since the cam shaft 13 and its usual S-shaped, brake shoe actuating cam (not shown) are of a conventional type, well known in the industry, it will be unnecessary to illustrate or describe these elements in detail herein.

The internally splined worm gear 29 is retained against axial displacement in the hub opening 28 by a pair of side plates 31 and 32, which are fitted one over each side of the hub portion 21, and are secured thereto by machine screws 33. The side plates 31 and 32 each have a circular hole 34 therein of a size to receive the cam shaft 13 rotatably therein, and concentric with the gear opening 28 in the hub 21 when said plates are mounted as shown in Figs. 1 and 3.

A radially extending recess 35 is provided in the hub 21 communicating with the gear opening 28 therein, and a worm pinion 37 is fitted into this recess, and in endwise thrust bearing relation with the sides thereof, as shown in Figs. 1 and 3. The worm pinion 37 is secured coaxially to a shaft 38, which is journaled in bushings 39 and 40 fitted into co-axial holes 41 and 42 provided therefor through the hub portion 21. The holes 41 and 42 and the recess 35 are so located that with the bushings 39 and 40 mounted respectively in said holes, and the worm pinion shaft 38 journaled in said bushings, the worm pinion 37 will be in meshed, driving engagement with the internally splined worm gear 29. A cap 43 is fitted over the outer end of the hole 41 to provide a dust tight seal thereover.

The bushing 40 extends beyond the hub portion 21 and through a hole 44 provided therefor in a plate 45, which is welded transversely across the two side plates 31 and 32 for the hub portion 21. This transverse plate 45 acts as a combined closure plate and mounting support for the air motor and gear housing 11, and is secured thereto by cap screws 47.

A worm gear 48 is secured co-axially to the shaft 38 beyond the outer end of the bushing 40, and a short bushing 49 is fitted into a hole 50 provided therefor in an embossment 51 in the opposite side of the housing 11 from the closure plate 45 to provide journal support for the outer end of shaft 38. A dust cap 52, similar to the cap 43, is also provided for the hole 50.

A second worm pinion 53 (Figs. 2 and 3) is formed with integral shaft extensions 54 and 55 which are journaled, respectively, in bushings 57 and 58 fitted into aligned holes 59 and 60 provided therefor in the housing 11. As illustrated in Figs. 2 and 3, the right hand portion 11a of the housing 11, in which the worm gear 48 and pinion 53 are mounted, is separated from the left hand portion 11b thereof, in which the air motor 10 and a planetary gearing 61 is mounted by an integral partition wall 62. This arrangement not only provides a convenient support for the shaft extension bushing 58, but also permits the use of a different type of lubricant in the housing portion 11a from that used in the other housing portion 11b.

The right hand shaft extension 54, as illustrated in Fig. 3, extends outwardly beyond its supporting bushing 57, and the projecting end portion 63 thereof is of square or hexagonal shape to receive a usual socket wrench (not shown) for adjusting the position of the brake arm 12 relative to the brake shoe actuating cam shaft 13. An internally threaded closure cap 64 is adapted to be screwed onto an externally threaded housing flange 65 which is provided around the projecting shaft portion 63.

The other shaft extension 55 projects into the housing portion 11b, and a cross head 67 is secured thereto. A pair of studs 68 and 69 are mounted on this cross head at equal distances from the axis of the shaft extension 55. A pair of planetary spur gears 70 and 71, journaled on the studs 68 and 69, respectively, are in meshed relation with an internally toothed ring gear 72, which is fitted into a recess 73 provided therefor in the housing portion 11b. The ring gear 72 is anchored in its recess 73 by a pair of anchor pins 74 (Fig. 3) which are fitted into aligned holes in the ring gear 72 and in the bottom of the ring gear recess 73. The planetary gears 70 and 71 are in meshed, driven engagement with a spur pinion 77 mounted on the drive shaft 78 of the motor 10.

The illustrated air motor 10 is of a conventional type, having a usual casing 79 of circular cross sectional shape, with a sliding vaned rotor (not shown) mounted eccentrically therein. Since the motor drive shaft 78 is co-axial with the eccentric rotor, said drive shaft is eccentric to the motor casing 79, as is apparent in Figs. 3 and 4. Since the motor itself is not a feature of this invention, and since the substitution of other types of motors will be obvious to those having routine knowledge of the art, it will be unnecessary to illustrate and describe the motor in detail herein.

The motor casing 79, as is apparent in Fig. 4 is seated partly on the bottom of its recess 80 in the housing 11, and partly by an annular spacing ring 81 which is fitted into the ring gear seat 73 on top of the ring gear 72. A cover plate 82 is fitted onto the housing 11 and is attached thereto by screws 83 to hold the air motor 10 firmly in its recess 80, and in contact with the spacing ring 81.

For anchoring the motor 10 against rotative displacement in the housing 11, and to supply highly pressurized air or gas to the motor, a usual gland 84 passes through a usual fitting 85 screwed into an internally threaded drilled boss 87 provided therefor on the housing 11. The gland 84 has close, pressure sealed connection with the usual air inlet opening (not shown) in the motor casing 79. Highly compressed air or gas from the pressure vessel 17 is adapted, upon the opening of the emergency valve 15, to flow through the supply lines 14, through the gland 84, and into the motor casing 79 for actuating the air motor 10. A usual outlet (not shown) in the motor casing 79 allows the air or gas to escape after it has performed its work.

As mentioned previously herein, one of the emergency brake actuating mechanisms A (Figs. 1, 2 and 3) is provided for each of a usual pair of truck or trailer wheels to which the invention is to be applied. The container 17 for the emergency supply of compressed air or gas is preferably completely independent of the usual compressed air supply (not shown) for working operation of the brakes of the truck or trailer upon which the mechanism A is mounted. For containing such emergency supply of air or gas it is preferred to employ a well known type of steel bottle of compressed carbon dioxide gas, which gas is usually bottled at a pressure of the order of 900 p.s.i. at a temperature of 65° F.

The emergency valve 15 is mounted between the container 17 and a Y-fitting 88 from which the supply lines 14 lead one to each air motor 10. A convenient location for the container 17 is on the axle (not shown) of the pair of wheels of the brake mechanism to be served thereby.

The emergency valve actuating handle 20 preferably is mounted in the driver's cab in such a way that it will require a special operative action on the part of the driver to actuate it. However, the specific type of actuating lever and its location is not material to the present invention, and any suitable handle may be employed. While the illustrated handle 20 is indicated as being of a mechanical type, it is obvious that electrical or other suitable valve actuating means may be substituted therefor if desired.

In using the present invention the brake cam actuating arm 12, with the emergency brake actuating mechanism A thereon, is mounted with the internally splined worm gear 29 fitted onto the usual, corresponding splined end of each brake cam actuating shaft 13 of a truck or trailer to be equipped with the invention. Each brake arm is connected by its associated rod 27 to its usual piston or diaphragm (not shown) of the conventional air brake mechanism of such truck or trailer.

The arm 12 may be rotatively adjusted at a required position relative to the cam shaft 13 by removing the cap 64, applying a suitable wrench (not shown) to the projecting end of the worm pinion shaft extension 54, and turning the worm pinion 53, and through it the worm gear 48 and worm pinion 37, thus to produce a relative rotative movement between the internally splined worm gear 29 on the cam shaft 13, and the brake actuating arm 12.

With the actuating arm 12 thus properly adjusted relative to the cam shaft 13, the brakes (not shown) of the truck or trailer upon which the mechanism A is mounted may be operated in a usual manner by means of the conventional air brake mechanism with which the truck or trailer is equipped. In the event, however, that emergency operation of the brakes is required, for example, in the event that the brakes of the truck or trailer upon which the mechanism A should fade, or otherwise fail to operate while the truck or trailer upon which the device is mounted is going down a long grade, the truck driver could thereupon operate the emergency handle 20, moving it from its solid to its broken line position of Fig. 3.

This operation opens the emergency valve 15, and releases the highly pressurized supply of air or other gas from the container 17, through the Y-fitting 88 and piping 14 to the motor 10. The motor 10, thus energized, rotatively drives the spur pinion 77, causing the planetary gears 70 and 71 to progress around the internally toothed ring gear 72, and thus rotatively to drive the cross-head 67. The latter, being secured to the worm pinion shaft extension 55, rotates the worm pinion 53, worm gear 48, pinion 37, and the internally splined worm gear 29. This action turns the cam shaft 13 and the usual brake shoe actuating cam (not illustrated), mounted on the other end of said cam shaft from the splined gear 29, to its maximum operated position, thereby forcing the brake shoes, with tremendous pressure, to their maximum operated position. This action causes a locking of the wheels of the truck or trailer upon which the mechanism A is mounted, and brings the vehicle to an emergency stop.

The invention provides a simple, and effective emergency brake mechanism and one which can be readily and inexpensively mounted on a great many existing brake mechanisms which are now in use. The brakes of a truck or trailer equipped with the present invention may be easily adjusted for normal use by means of a wrench applied to the squared end 63 of the worm pinion shaft extension 54. The mechanism adds very little weight to a vehicle upon which it is mounted, and although it may never be used, if its use is required it may save the truck or truck-trailer upon which it is mounted from destruction.

While we have illustrated and described a preferred embodiment of the present invention, it will be understood, however, that various changes and modifications may be made in the details thereof without departing from the scope of the invention as set forth in the appended claims.

Having thus described the invention, what we claim as new and desire to protect by Letters Patent is defined in the following claims.

We claim:

1. Emergency actuating means for a truck brake having an actuating arm therefor journaled on a brake shoe actuating cam shaft, the latter having a worm gear splined concentrically thereon; said actuating means comprising a prime mover mounted on said arm, a power multiplying gear train driven by said prime mover and in meshed, driving relation with the worm gear on said cam shaft, whereby, actuation of the prime mover to drive the gear train in a selected direction drives the worm gear on the cam shaft, thereby turning the cam shaft in a brake shoe actuating direction, and emergency operating means mounted within reach of a driver of a vehicle upon which said emergency actuating means is mounted for operating said prime mover, thereby to turn said cam shaft to its maximum brake shoe operating condition.

2. Emergency actuating means for a truck brake having an actuating arm therefor mounted on a brake shoe actuating cam shaft; said actuating means comprising a prime mover operatively mounted between said arm and said cam shaft, power multiplying means driven by said prime mover and in relative driving relation between the arm and the cam shaft, whereby, actuation of the prime mover to drive the power multiplying means in a selected direction causes a relative rotative movement between the arm and the cam shaft, thereby turning the cam shaft in a brake shoe actuating direction, and emergency operating means mounted within reach of a driver of a vehicle upon which said emergency actuating means is mounted for operating said prime mover, thereby to turn said cam shaft to its maximum brake shoe operating condition.

3. Emergency actuating means for a truck brake having an actuating arm therefor journaled on a brake shoe actuating cam shaft, the latter having a worm gear splined concentrically thereon; said actuating means comprising a housing mounted on said arm, an air motor carried by the housing and with its drive shaft extending into the housing, a pinion on the motor shaft, an internally toothed ring gear mounted in the housing coaxially of the motor shaft, planetary gears in meshed relation with the ring gear and pinion, a cross head driven by the planetary gears, and reduction gearing connecting the cross head to the worm gear on the cam shaft, whereby, actuation of the air motor to drive the cross head and gearing in a selected direction drives the worm gear on the cam shaft, thereby turning the cam shaft in a brake shoe actuating direction, and emergency motor control means mounted within reach of a driver of a vehicle upon which said emergency actuating means is mounted for operating said air motor, thereby to turn said cam shaft to its maximum brake shoe actuating condition.

4. Emergency actuating means for a truck brake having an actuating arm therefor journaled on a brake shoe actuating cam shaft, the latter having a worm gear splined thereon; said actuating means comprising a worm pinion in driving relation with the worm gear, a shaft supporting the worm pinion, a portion of said shaft extending beyond the arm, a housing mounted on the arm and enclosing the extending shaft portion, an air motor carried by the housing, power multiplying gearing in the housing and in driving relation between the air motor and the extending shaft portion within the housing, a pressure vessel having an outlet therein, and adapted to be mounted adjacent said arm, an emergency valve controlling such outlet, said vessel being charged with highly compressed gas, and piping communicating the valve to the air motor, whereby, upon opening said valve, the supply of gas in the pressure vessel actuates the air motor and thereby drives the gear train and the worm gear, thereby turning the cam shaft in a brake-shoe-actuating direction, and emergency valve operating means mounted within reach of a driver of a vehicle upon which said emergency actuating means is mounted for opening the emergency valve.

5. Emergency actuating means for a truck brake having an actuating arm therfor journaled on a brake shoe actuating cam shaft, the latter having a worm gear splined thereon and journaled in a hole provided therefor in said arm, said actuating means comprising a pair of side plates mounted one on each side of said arm over the hole therein for said worm gear, a plate mounted transversely across the edges of said side plates, a housing mounted on the transversely mounted plate with an open side of the housing closed by the transversely mounted plate, an air motor mounted in a side of the housing remote from that closed by the transversely mounted plate, a worm pinion in driving relation with the worm gear, a shaft supporting the worm pinion, a portion of said shaft extending through the transversely mounted plate into the housing, power multiplying gearing in the housing and in driving relation between the air motor and the extending shaft portion within the housing, a pressure vessel having an outlet therein, and adapted to be mounted adjacent said arm, an emergency valve controlling such outlet, said vessel being charged with highly compressed gas, and piping communicating the valve to the air motor, whereby, upon opening said valve, the supply of gas in the pressure vessel actuates the air motor and thereby drives the gear train and the worm gear, thereby turning the cam shaft in a brake-shoe-actuating direction, and emergency valve operating means mounted within reach of a driver of a vehicle upon which said emergency actuating means is mounted for opening the emergency valve.

6. Emergency actuating means for a truck brake having an actuating arm therefor journaled on a brake shoe actuating cam shaft, the latter having a worm gear splined thereon; said actuating means comprising a worm pinion in driving relation with the worm gear, a shaft supporting the worm pinion, a portion of said shaft extending beyond the arm, a housing mounted on the arm and enclosing the extending shaft portion, an air motor carried by the housing, power multiplying gearing in the housing and in driving relation between the air motor and the extending shaft portion within the housing, a portion of said gearing being formed for interfitted relation with a wrench, a removable cover overlying an opening in a side of the housing through which opening upon removal of said cover, said formed portion is exposed to receive such wrench for rotative adjustment of the arm relative to the cam shaft, a pressure vessel having an outlet therein, and adapted to be mounted adjacent said arm, an emergency valve controlling such outlet, said vessel being charged with highly compressed gas and piping communicating the valve to the air motor, whereby, upon opening said valve, the supply of gas in the pressure vessel actuates the air motor and thereby drives the gear train and the worm gear, thereby turning the cam shaft in a brake-shoe-actuating direction, and emergency valve operating means mounted within reach of a driver of a vehicle upon which said emergency actuating means is mounted for opening the emergency valve.

References Cited in the file of this patent

UNITED STATES PATENTS

| | | |
|---|---|---|
| 2,409,908 | Simpkins | Oct. 22, 1946 |
| 2,551,888 | Learn | May 8, 1951 |
| 2,554,064 | Sheilds | May 22, 1951 |
| 2,645,313 | Shaadt | July 14, 1953 |
| 2,768,712 | Phipps | Oct. 30, 1956 |
| 2,862,583 | Granche | Dec. 2, 1958 |